(12) United States Patent
Parrish et al.

(10) Patent No.: US 11,666,990 B2
(45) Date of Patent: Jun. 6, 2023

(54) WELDED ASSEMBLIES AND METHODS OF MAKING WELDED ASSEMBLIES

(71) Applicant: RAYTHEON TECHNOLOGIES CORPORATION, Farmington, CT (US)

(72) Inventors: Russell P. Parrish, Glastonbury, CT (US); Thomas M. Barry, Jr., East Hampton, CT (US); Felix I. Quiros-Pedraza, Manchester, CT (US); Harvey C. Lee, Newington, CT (US); Michael A. Disori, Vernon, CT (US); Alison Schoolcraft, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 1438 days.

(21) Appl. No.: 15/966,696

(22) Filed: Apr. 30, 2018

(65) Prior Publication Data
US 2018/0290238 A1    Oct. 11, 2018

Related U.S. Application Data

(62) Division of application No. 14/492,663, filed on Sep. 22, 2014, now Pat. No. 9,956,647.

(60) Provisional application No. 61/881,623, filed on Sep. 24, 2013.

(51) Int. Cl.
*B23K 26/244* (2014.01)
*B23K 26/32* (2014.01)
*B23K 101/00* (2006.01)
*B23K 103/06* (2006.01)
*B23K 103/18* (2006.01)

(52) U.S. Cl.
CPC ............ *B23K 26/244* (2015.10); *B23K 26/32* (2013.01); *B23K 2101/001* (2018.08); *B23K 2103/06* (2018.08); *B23K 2103/26* (2018.08); *Y10T 403/478* (2015.01)

(58) Field of Classification Search
CPC ...... B23K 26/244; B23K 26/28; B23K 26/32; Y10T 403/477; Y10T 403/478
See application file for complete search history.

(56) References Cited

U.S. PATENT DOCUMENTS

| | | |
|---|---|---|
| 4,263,496 A | 4/1981 | Medlar |
| 4,727,232 A | 2/1988 | Omori et al. |
| 4,833,295 A | 5/1989 | Locker et al. |
| 4,854,467 A | 8/1989 | Budenbender |
| 4,873,415 A | 10/1989 | Johnson et al. |
| 5,104,032 A | 4/1992 | Spies et al. |
| 5,131,710 A | 7/1992 | Kamiguchi et al. |
| 5,451,742 A | 9/1995 | Nishio et al. |
| 5,454,480 A | 10/1995 | Morris |
| 5,595,670 A | 1/1997 | Mombo-Caristan |
| 5,603,853 A | 2/1997 | Mombo-Caristan |

(Continued)

*Primary Examiner* — Daniel J Wiley
(74) *Attorney, Agent, or Firm* — Cantor Colburn LLP

(57) ABSTRACT

A welded assembly includes a first sheet and a second sheet. The second sheet is disposed over a portion of the first sheet and defines an overlap portion between the first and second sheets. A weld fastening the second sheet to the first sheet in the overlap area connects the second sheet to the first sheet for distributing stress uniformly across a welded portion of the overlap area.

16 Claims, 5 Drawing Sheets

(56) References Cited

U.S. PATENT DOCUMENTS

| | | | |
|---|---|---|---|
| 6,060,682 A | | 5/2000 | Westbroek et al. |
| 6,187,451 B1 | | 2/2001 | Boos |
| 6,794,603 B1 | | 9/2004 | Musselman |
| 6,906,281 B2 | | 6/2005 | Musselman |
| 7,154,065 B2 | * | 12/2006 | Martukanitz .......... B23K 26/26 |
| | | | 219/121.64 |
| 7,732,033 B2 | | 6/2010 | Van Aken et al. |
| 7,739,872 B2 | * | 6/2010 | Murphy .................... F02K 1/78 |
| | | | 60/770 |
| 8,350,185 B2 | | 1/2013 | Lee et al. |
| 9,169,860 B2 | | 10/2015 | Itoh et al. |
| 9,623,515 B2 | | 4/2017 | Breuer et al. |
| 2004/0000539 A1 | | 1/2004 | Takikawa et al. |
| 2007/0084835 A1 | | 4/2007 | Dinauer et al. |
| 2008/0053098 A1 | * | 3/2008 | Morenko ................ F23R 3/002 |
| | | | 60/752 |
| 2009/0180872 A1 | * | 7/2009 | Lundgren ............. F04D 29/522 |
| | | | 415/215.1 |
| 2009/0266801 A1 | | 10/2009 | Oku et al. |
| 2010/0147809 A1 | * | 6/2010 | Geisler .................. B60N 2/682 |
| | | | 219/121.64 |
| 2011/0262277 A1 | * | 10/2011 | Sjoqvist ................ F01D 25/162 |
| | | | 416/213 R |
| 2015/0086262 A1 | | 3/2015 | Parrish et al. |
| 2015/0174702 A1 | | 6/2015 | Fujimoto et al. |
| 2015/0306708 A1 | | 10/2015 | Pape et al. |
| 2016/0268541 A1 | | 9/2016 | Dabich, II et al. |

\* cited by examiner

WELDED ASSEMBLIES AND METHODS OF MAKING WELDED ASSEMBLIES

CROSS-REFERENCE TO RELATED APPLICATIONS

This application is a divisional of U.S. application Ser. No. 14/492,663 filed Sep. 22, 2014, and claims the benefit of an earlier filing date from U.S. Provisional Application No. 61/881,623 filed Sep. 24, 2013, the entire disclosure of which are incorporated herein by reference.

BACKGROUND

The present disclosure relates to welded assemblies, and more particularly to welded joints for coupling hot sheets and cold sheets such as in hot sections of gas turbine engines.

Gas turbine engine hot section interiors can operate at extremely high temperatures. They typically include a liner that is directly exposed to a flow of hot combustion gases during engine operation for extended periods. The liner, i.e. a hot sheet, is typically a sheet metal structure surrounding the combustion flow space aft of where fuel and oxidizer flows are mixed and ignited prior to being passed to the turbine section. In certain engines an outer liner, e.g. a cold sheet, envelopes the hot sheet. The cold sheet is spaced away from the hot sheet such that a plenum is defined between the outer surface of the hot sheet and the inner surface of the cold sheet. Working fluid, typically air, is extracted from the compressor section of the engine and flows through the plenum between the cold sheet and the hot sheet for purpose cooling the hot sheet.

The hot sheet requires structure to fix the hot sheet within the engine. Generally, hot sheets couple to engine structure using sheet metal structures attached the hot sheet outer surface. In hot sections including cold sheet and hot sheet portions, these sheet metal structures extend through the plenum and form joints on opposite ends at the inner surface of the cold sheet and outer surface of the hot sheet. Because the stress imposed on the coupling structure, the respective joints on the cold sheet and hot ends are generally formed by a brazing process. Due to extreme temperatures and materials from the cold, hot sheet, and coupling body are constructed theses brazes are typically relatively costly nickel or gold-nickel brazes.

Conventional brazed joints have generally been considered satisfactory for their intended purpose. However, there is a continuing need to reduce cost and complexity of engine manufacture. There also remains a need for lightweight joints for applications such as those described above. The present disclosure provides a solution for these problems.

BRIEF DESCRIPTION

A welded assembly includes a first sheet and a second sheet. The second sheet is disposed over a portion of the first sheet and defines an overlap portion between the first and second sheets. A weld in the overlap area connects the second sheet to the first sheet. The weld is configured and adapted for reducing peak stress and smoothing the stress distribution within the weld and overlap area of the sheets.

In certain embodiments, the second sheet is a coupling member for supporting a liner in a gas turbine engine hot section. The first sheet can be a hot sheet of a gas turbine hot section. The first sheet can be a cold sheet associated with a gas turbine hot section. A Z-band coupling a hot sheet to a cold sheet of a gas turbine engine can form the second coupling member. The welded assembly can form a lap joint coupling the first and second sheets to one another.

In accordance with certain embodiments, the weld includes a weld line tracing a linear shape in the overlay area. In accordance with certain embodiments, this can include a weld line tracing an arcuate segment in the overlay area. The weld can further include second and a third arcuate weld line segment disposed on opposite ends of the first arcuate weld line segment wherein the second and third segments have different curvatures from the first arcuate segment.

It is contemplated that the weld can include a weld line tracing an elliptical segment in the overlay area. The second sheet can include a laterally extending bend line extending parallel to the major axis of the ellipse. The elliptical segment can open in a direction opposite the bend line. A distance between the weld line and the bend line can be about a quarter the length of the minor radius of the ellipse. An end of the weld line can be offset from a lateral edge of the second sheet by a distance about one and a half times the minor radius of the ellipse. The elliptical weld line segment can be centered with respect to a loading axis of the second sheet.

A gas turbine hot section includes a welded assembly as described above. The first sheet is a combustion gas space liner and the second sheet is a z-band for coupling the liner within the engine. The weld includes a weld line tracing an elliptical segment in the overlap area, and the second sheet includes a laterally extending bend line parallel to the major axis of the ellipse such that the elliptical segment opens in direction opposite the bend line. A distance between the weld line and the bend line is about a quarter the length of the minor radius of the ellipse and a distance between an end of the elliptical segment and a lateral edge of the second sheet is about one and a half times the length of the minor radius of the ellipse. The elliptical segment is centered with respect to a loading axis of the second sheet.

A method of forming the welded assembly described above includes overlapping a portion of the first sheet with the second sheet and forming a weld fastening the first sheet to the second sheet by tracing an elliptical weld line in the overlap area. The weld is formed using a laser welding process.

It is contemplated that the second sheet includes a bend line and the method include defining the weld line an offset distance about a quarter of the minor radius of the ellipse. The weld line can be offset by about one a half times the minor radius of the ellipse from an edge of the second sheet.

The foregoing features and elements may be combined in various combinations without exclusivity unless expressly indicated otherwise. These features and elements, as well as the operation thereof, will become more apparent in light of the following description and the accompanying drawings. It should be understood, however, that the following description and drawings are intended to be exemplary in nature and non-limiting.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
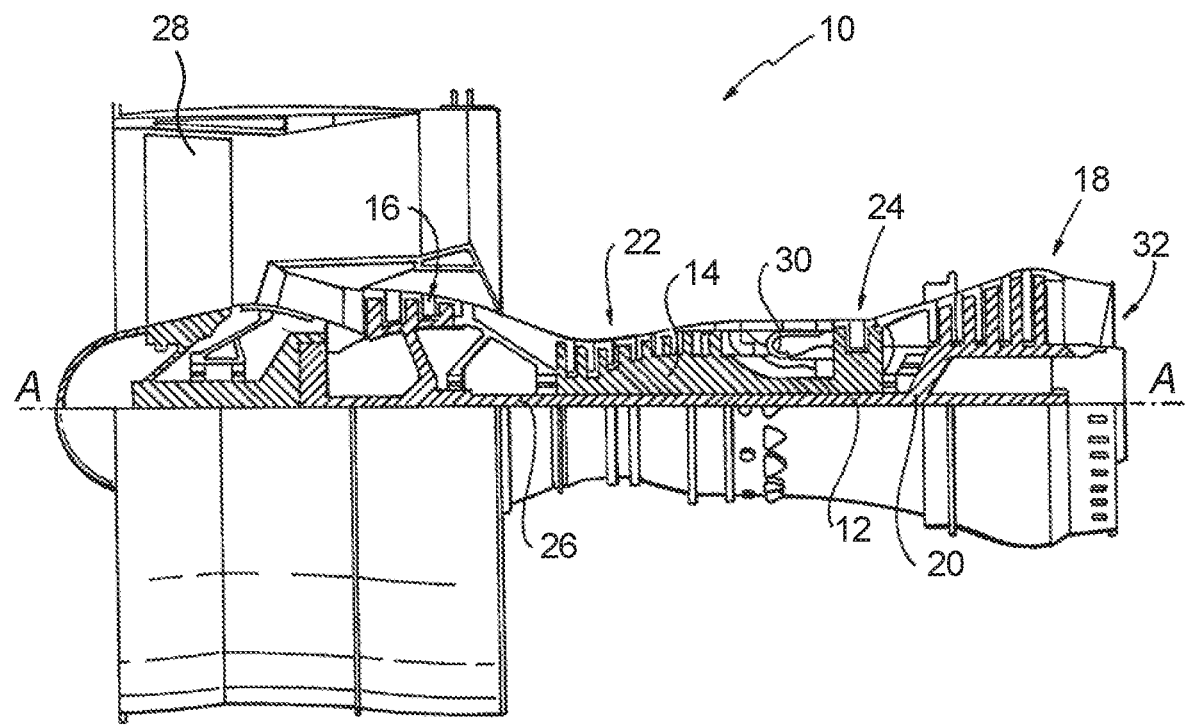
FIG. 1 is a partial cross-sectional side view of an exemplary embodiment of a gas turbine engine, showing the engine hot section.

Reference will now be made to the drawings wherein like reference numerals identify similar structural features or aspects of the subject disclosure. For purposes of explanation and illustration, and not limitation, a partial view of an exemplary embodiment of a gas turbine engine including a lap joint in accordance with the disclosure is shown in FIG. 1 and is designated generally by reference character 100. Other embodiments of lap joints in accordance with the disclosure, or aspects thereof, are provided in FIGS. 2-6, as will be described. The systems and methods described herein can be used in lap joints for supporting combustion gas space liners in gas turbine engines, such as at hot sheet and cold sheet connections for example.

With reference to FIG. 1, a gas turbine engine 10 is shown. Gas turbine engine 10 includes low-pressure spool 12 and a high-pressure spool 14. Low-pressure spool 12 includes a low-pressure compressor 16 and low-pressure turbine 18 connected by low-pressure shaft 20. High-pressure spool 14 includes a high-pressure compressor 22 and high-pressure turbine 24 connected by high-pressure shaft 26. A fan 28 connects to low-pressure shaft 20. A hot section 30/18/24 extends between a combustor 30 and a low-pressure turbine 18, and includes high-pressure turbine 24. In the illustrated embodiment, hot section 30/18/24 of gas turbine engine 10 includes an augmenter 32. The general construction and operation of gas turbine engines is understood in the art, and therefore detailed discussion here is unnecessary.

Working fluid enters low-pressure compressor 16 and is compressed by low-pressure compressor 16. The working fluid then enters high-pressure compressor 22, which further compresses the working fluid. The working fluid then enters combustor 30 where it is mixed with fuel and ignited, forming hot high-pressure combustion gases. The working fluid thereafter flows through high-pressure turbine 24 and low-pressure turbine 18 which expand the working fluid, extracting work, and rotating low-pressure shaft 20, high-pressure shaft 26 and fan 28 about a rotation axis A. Rotation of the low-pressure shaft and high-pressure shaft 26 compresses working fluid flowing through the engine and rotation of fan 28 provides thrust to a vehicle coupled to gas turbine engine 10, such as an aircraft. Additional fuel can be added to combustion gases exiting low-pressure turbine 18 in augmenter 32, generating additional thrust and exposing engine structure within augmenter 32 to extremely high temperatures.

Figure 2:
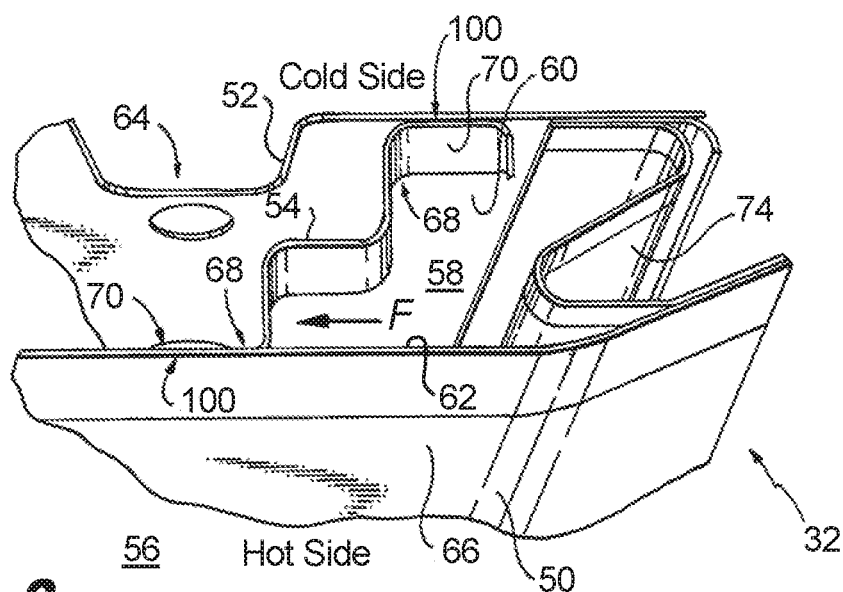
FIG. 2 is a cross-sectional side view of a portion of a hot sheet coupled to a cold sheet, showing a coupling extending between the hot sheet and the cold sheet.

With reference to FIG. 2, a portion of hot section 30/24/18 is shown. Hot section 30/24/18 includes an interior liner 50 (e.g. a hot sheet), an exterior liner 52, and a coupling member 54. Interior liner 50 is a hot sheet and is bounded on one side by a hot gas space 56. Exterior liner 52 is a cold sheet and substantially envelopes interior liner 52 for separating engine components (shown in FIG. 1) from combustion gas space 56. Interior liner 50, exterior liner 52 and coupling member 54 are constructed from a material suitable for extreme temperature environments such as a nickel alloy. One such alloy is Inconel®, available from Inco Alloys International, Inc. of Huntington, W. Va.

A coolant plenum 58 is defined between interior liner 50 and exterior liner 52. Coolant plenum 58 is bounded by an inner surface 60 of exterior liner 52 and an outer surface 62 of interior liner 50. Coolant plenum 58 is fluidly coupled to a coolant source, e.g. low-pressure compressor 16 or high-pressure compressor 22, and is configured and adapted direct coolant extracted from the coolant source across outer surface 62 for purposes of cooling interior liner 50. In the illustrated embodiment, a coolant flow enters coolant plenum 58 through an inlet 64 defined in exterior liner 52 fluidly coupled to the coolant source and is distributed about outer surface 62 of interior liner 50. Coolant flows from coolant plenum 58 into combustion gas space 56 through at least one channel defined in interior liner 50, thereby providing a coolant boundary layer adjacent an interior surface 66 of interior liner 50. This allows for operating hot section 18/24/30, and in engines so equipped, augmenter 32, with an interior temperature above the temperature at which the mechanical properties of the material of which interior liner 50 are stable. As will be appreciated by those skilled in the art, other configurations are possible within the scope of the present disclosure.

Coupling member 54 couples interior liner 50 to exterior liner 52. Coupling member 54 has a sheet-like structure and includes a plurality of folds 68 along its longitudinal length between outer surface 62 of interior liner 50 and interior surface 60 of exterior liner 52. With reference to fold 68 adjacent outer surface 62 of interior liner 50, fold 68 defines a terminal portion 70 of coupling member 54 disposed over outer surface 62 of interior liner 50. In the illustrated embodiment, coupling member 54 is a Z-band. As will be appreciated by those skilled in the art, coupling members of other types are within the scope of the present disclosure, such as an S-band 74 or differently shaped coupling member (also shown in FIG. 2).

Figure 3A:
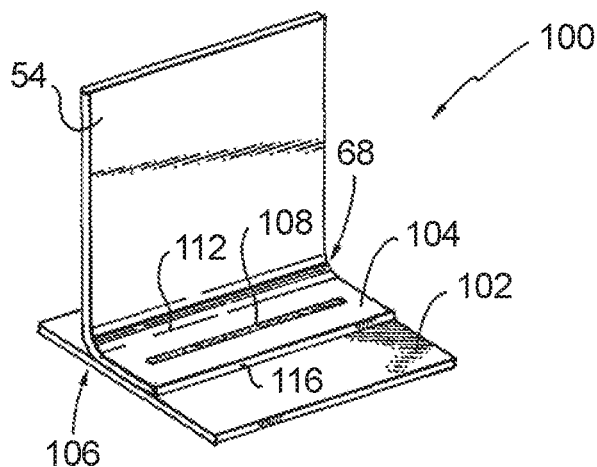
FIG. 3A is perspective view of a lap joint, showing a linear weld.

With reference to FIG. 3A, a lap joint formed by welded assembly 100 is shown. Liner 50 forms a first sheet 102. A terminal portion of coupling member 54 forms a second sheet 104 disposed a portion of first sheet 50. An overlap region 106 is defined within the boundaries of first sheet 50 between first and second sheets 50 and 70. A weld 108 defined within overlap region 106 couples second sheet 104 to first sheet 102. Welded assembly 100 is formed from first sheet 102, second sheet 104 and a linear weld 108 joins coupling member 54 to interior liner 50, thereby defining a hot sheet joint. A similarly constructed welded assembly 100 can be formed on an opposite end of coupling member 54 at its connection point with exterior liner 52, thereby defining a cold sheet joint.

Figure 3B:
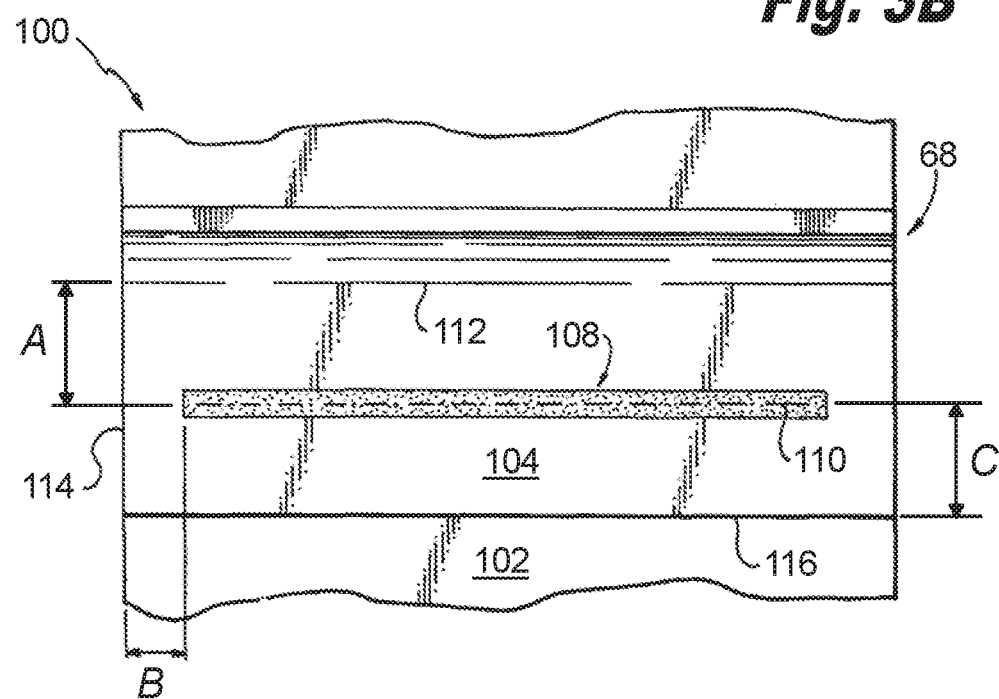
FIG. 3B is a plan view of the weld of FIG. 3A, showing a linear weld line.
Figure 3C:
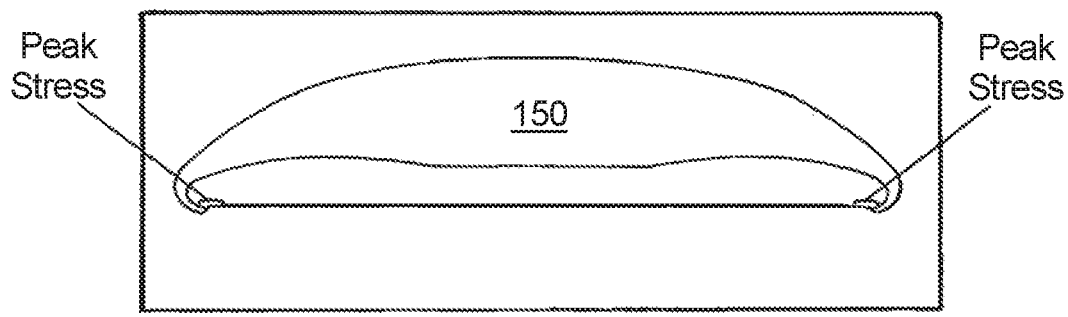
FIG. 3C is a contour map showing stress distribution in the lap joint of FIG. 3A, showing peak stress points in opposing ends of the weld and stress distribution in the joint.

With reference to FIG. 3B, linear weld 108 is shown. Weld 108 has a linear shape and traces a linear weld line 110 extending laterally across second sheet 102. Weld line 110 extends parallel to a bend line 112 defined by fold 68, weld line 110 being offset from bend line 112 by a first longitudinal offset distance A. Weld line 110 is also laterally offset from a lateral edge 114 of second sheet 102 by a lateral offset distance B. Weld line 110 is additionally offset from a longitudinal edge 116 on an opposite side of weld 108 by a second longitudinal offset distance C. During operation interior liner 50 and exterior liner 52 can be exposed to different temperatures and expand at different rates. This imposes a shear force F (shown in FIG. 2) on welded assembly 100 that imposes stress in the joint formed by the assembly. This stress can exceed that tolerable by welds formed using conventional welding processes. For that reason, and for the need to join structures fabricated from materials less amenable to conventional welding processes, conventional hot sheet to Z-band joints are using a brazing process. Embodiments of the welded assemblies described herein utilize welds with functional, geometrically defined weld patterns that more evenly distribute that conventional welds, thereby reducing weld stress and avoiding (or reducing) use brazes in such hot sheet and/or cold sheet joints. For example, linear weld 108 is configured and adapted to distribute stress within welded assembly 100 such that force F imposes a stress distribution 150 (shown in FIG. 3C) having the contour illustrated and with peak stress occurring at opposite ends of linear weld 108. In an exemplary embodiment of welded assembly 200, first and second longitudinal offset distances A and C are about 1.5 times lateral offset distance B, thereby producing the stress distribution 250 illustrated in FIG. 4C.

Figure 4A:
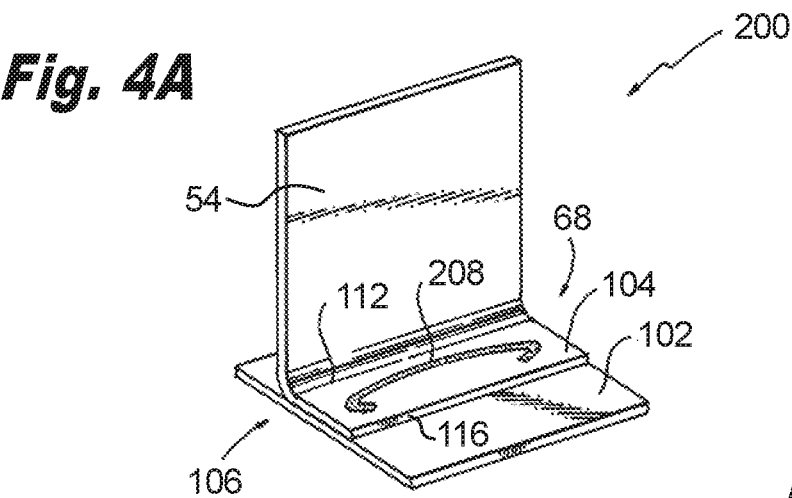
FIG. 4A is perspective view of a second lap joint, showing an arcuate weld.
Figure 4B:
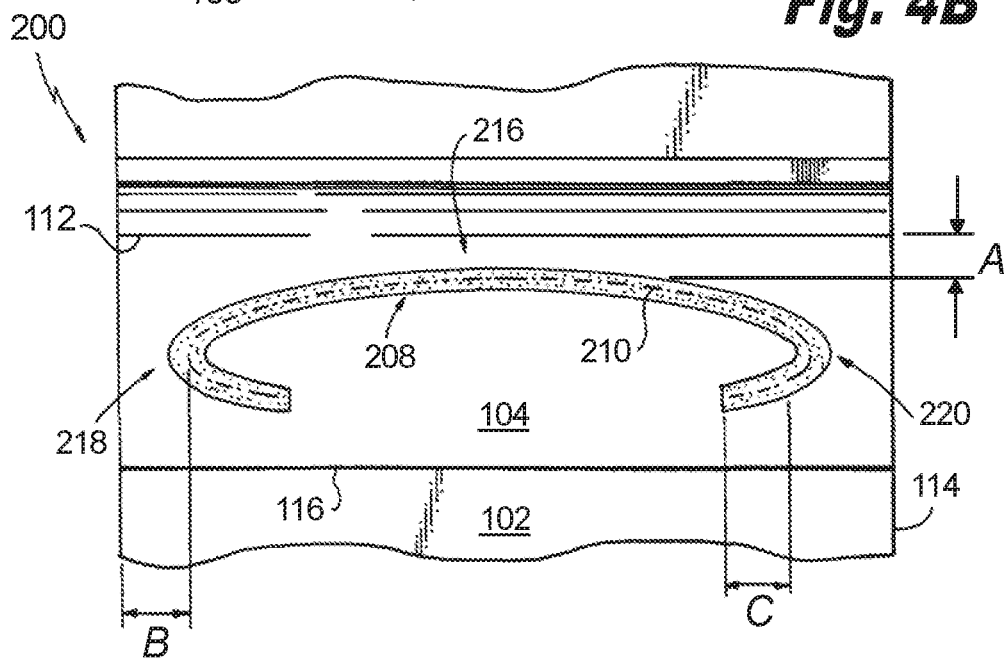
FIG. 4B is a plan view of the weld of FIG. 4A, showing an arcuate weld line.

Turning now to FIG. 4A, welded assembly 200 is shown. Welded assembly 200 is similar to welded assembly 100, and additionally includes an arcuate weld 208. With reference to FIG. 4B, arcuate weld 208 traces an arcuate weld line 210 within overlap area 106 including at least one arcuate segment 216. In the illustrated embodiment, arcuate segment 216 is a first arcuate segment and arcuate weld 208 further includes a second arcuate segment 218 and a third arcuate segment 220. Second arcuate segment 218 is formed on an end of first arcuate segment 216 and third arcuate segment is formed on an opposite end of first arcuate segment 216, thereby forming a continuous weld having a plurality of arcuate weld segments 216, 218 and 210.

Arcuate weld line 210 is offset from a bend line 112 defined by fold 68, arcuate weld line 210 being offset from bend line 112 by a first longitudinal offset distance A. Arcuate weld line 210 is also laterally offset from a lateral edge 114 of second sheet 102 by a lateral offset distance B. Arcuate weld line 210 further defines a linear segment C parallel with respect to bend line 112 in each of arcuate segments 216 and 218. In an exemplary embodiment of welded assembly 200, longitudinal offset distance A and lateral offset distance B are about twice the length of linear segment C and the main bend radii is about three times the staple bend radii.

Figure 4C:
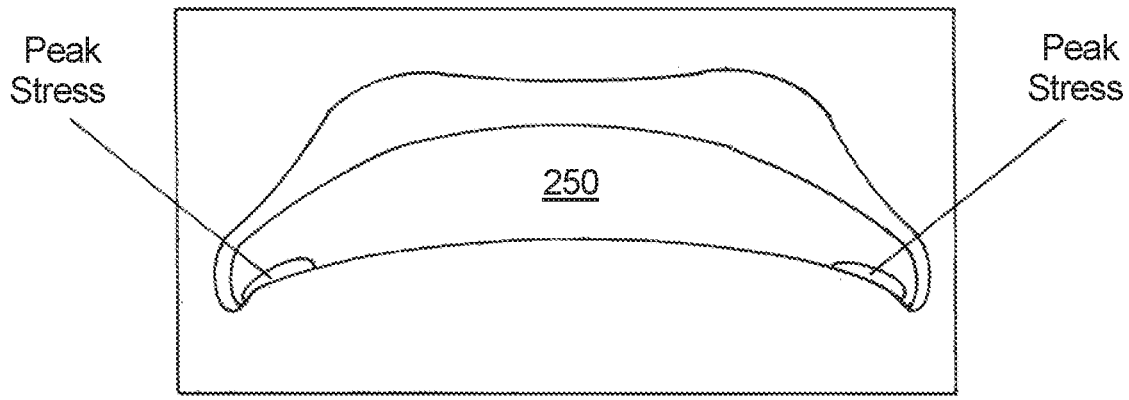
FIG. 4C is a contour map showing stress distribution in the lap joint of FIG. 4A, showing peak stress locations and stress distribution associated with a load applied to the assembly.

With reference to FIG. 4C, force F induces stress within the exemplary embodiment of welded assembly 200 with a stress distribution 250 and illustrated stress contours. Notably, the area within welded assembly 200 through which stress is distributed in larger than that associated with welded assembly 100. Points of relative peak stress are also laterally inward with respect to lateral ends of weld 208 as compared to weld 108. For a given force F, peak stress imposed within welded assembly 200 is about 65% of peak stress imposed within welded assembly 100. Redistributing stress, as well as shifting and reducing peak stress make the stress resultant from force F on welded assembly 200 more tolerable and allow for construction of joints between hot sheets and Z-bands without brazes.

Figure 5A:
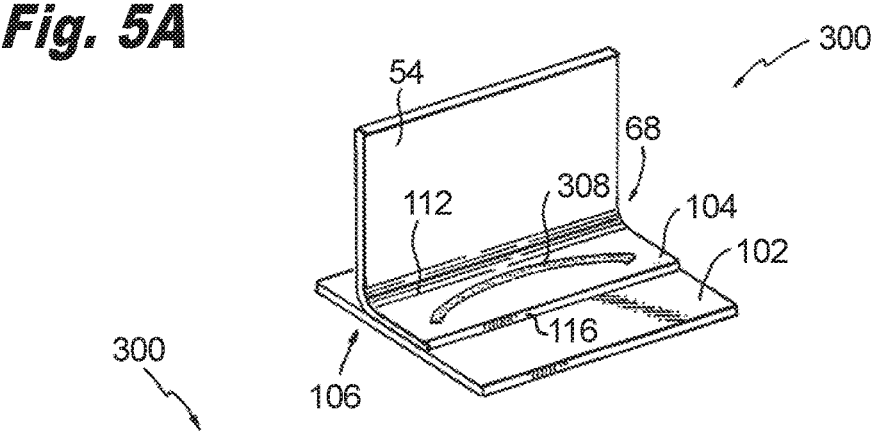
FIG. 5A is perspective view of a third a lap joint, showing an elliptical weld.

Turning now to FIG. 5A, a welded assembly 300 is shown. Welded assembly 300 is similar to welded assembly 100 and additionally includes an arcuate weld 308. Weld 308 has an elliptical shape and fastens second sheet 104 to first sheet 102 and is defined within overlap area 106. Weld 308, second sheet 104 and first sheet 102 form a joint including welded assembly 300 such for fixing a hot gas space liner within a gas turbine engine for example.

Figure 5B:
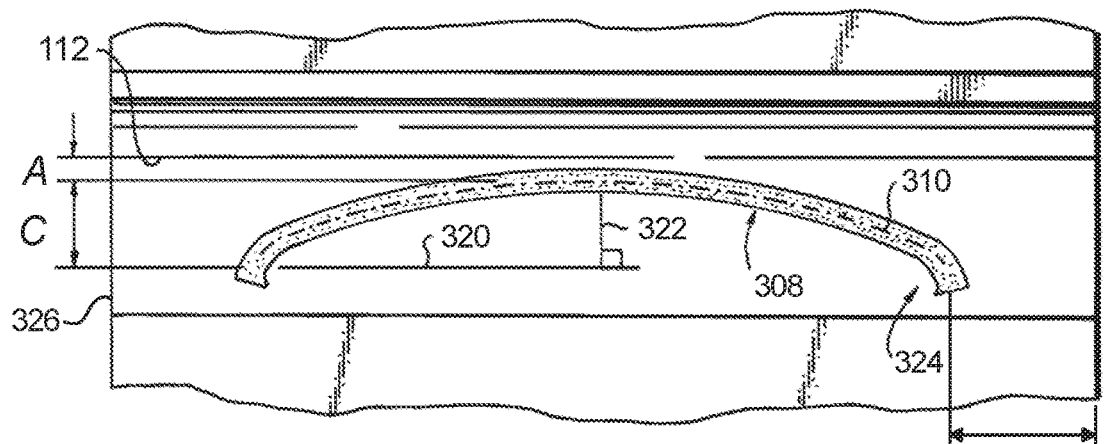
FIG. 5B is a plan view of the weld of FIG. 5A, showing an elliptical weld line.

With reference to FIG. 5B, weld 308 includes a weld line 310. Weld line 310 traces a segment of an ellipse, and in the illustrated embodiment traces about a side portion of an ellipse bisected by a major axis 320 of the ellipse. A minor radius 322 of the ellipse has a length C that is about four times longitudinal offset distance A. Minor radius 322 is about three quarters the length of lateral offset B between a lateral end 324 of weld 308 and a lateral edge 326 of second sheet 104

Figure 5C:
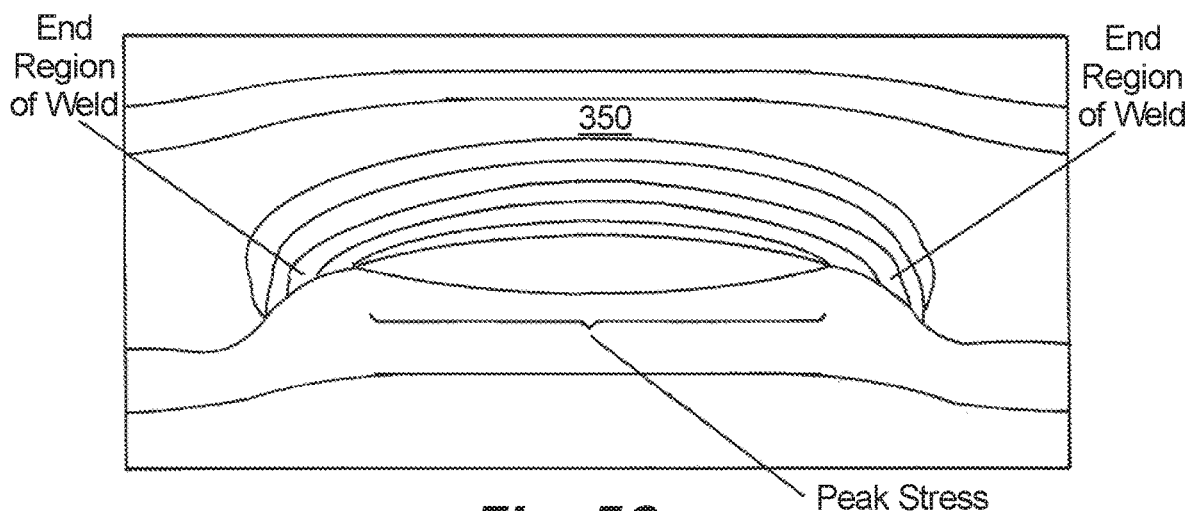
FIG. 5C is a contour map showing stress distribution in the lap joint of FIG. 5A, showing peak stress points and stress distribution in the joint.

With reference to FIG. 5C, a stress distribution 350 associated with force F within welded assembly 300 is shown. For a force F, peak stress within welded assembly 300 is about 25% of peak stress with welded assembly 100. An area of welded assembly 300 within which stress is distributed is greater than that of stress distributions 250 and 150. Peak stress occurs along an interior segment of weld 308, over a length of the weld instead of at points of peak stress as is the case with welds 108 and 208. Redistributing stress, and further shifting and reducing peak stress make the stress resultant from force F on welded assembly 300 more tolerable. This allows for construction of joints between hot sheets and Z-bands without brazes.

In an exemplary embodiment, weld line 310 is offset from bend line 112 by a distance about 4.16 times the length of the minor radius of the ellipse and an end of the weld line is offset from lateral edge 326 by a distance about 6.6 times the length of the minor radius of the ellipse. This reduces peak stress in weld 308 to about 25% of peak stress in linear weld 108. As will be appreciated, the relative amount of stress improvement is influenced by other factors in additional to weld geometry, such as the total weld area and total weld length for example.

Figure 6:
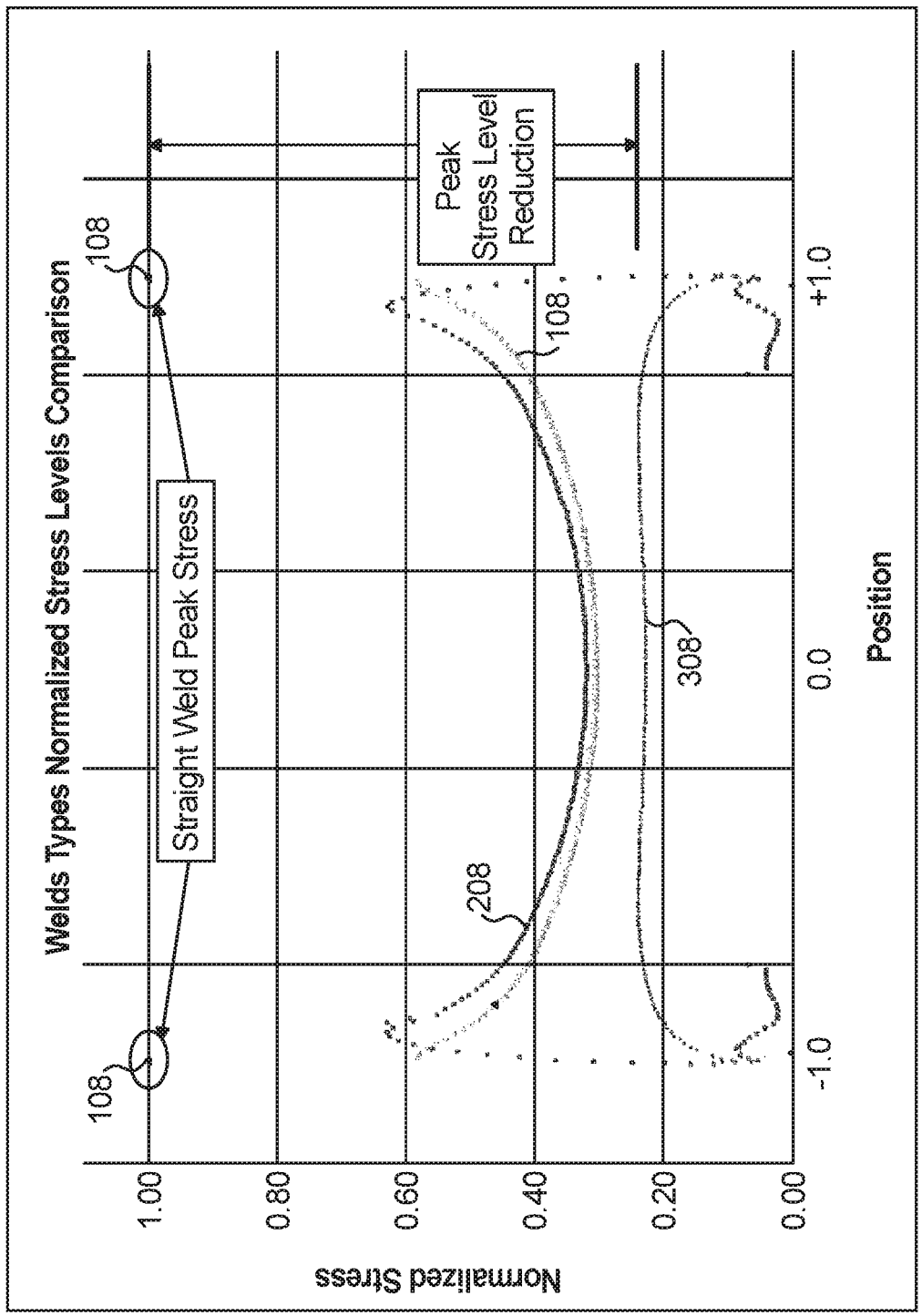
FIG. 6 is a chart showing relative stress for a load within the linear weld, arcuate weld, and elliptical weld of FIG. 3A, FIG. 4A, and FIG. 5A, respectively.

With reference to FIG. 6, a plot of normalized weld stress is shown along respective lengths of linear weld 108, arcuate weld 208, and elliptical weld 308. Peak stress in arcuate weld 208 is reduced by about 40% in relation to peak stress in linear weld 108 as well as shifted inwards from respective ends of arcuate weld 208 in relation to weld 108. This makes arcuate weld 208 more reliable when subjected to force F. Peak stress in elliptical weld 308 is further reduced, being about 25% of that within linear weld 108. Peak stress is also shifted inwards and distributed over a greater length of weld 308 in comparison to linear weld 108 and arcuate weld 208. This provides additional improvements in reliability when subjected to force F.

Embodiments of the welded assembled described herein provide assemblies with reduced weld stress for a force, weld length and weld area through the weld geometries described above. These geometries provide welded assemblies with better weld (and assembly) stress distribution and peak stress without requiring additional welding time, expense or risk of an enlarged heat affected zone. Embodiments of the welds described herein also provide for rapidly fabricating consistent welds using a laser as the geometry is continuous. This allows for continuously forming the weld by welding without having to alter the output power of the laser. As lasers are more easily controlled at constant output power, continuous weld geometries as described herein allow for welding at constant output power for producing a relatively consistent weld structure within the overlap area.

The methods and systems of the present disclosure, as described above and shown in the drawings, provide for welded assemblies with superior properties including reduced peak stress and more uniform stress distribution across the welded joint for a given load. While the apparatus and methods of the subject disclosure have been shown and described with reference to preferred embodiments and in the context of an augmenter (i.e. an afterburner), those skilled in the art will readily appreciate that changes and/or modifications may be made thereto without departing from the spirit and scope of the subject disclosure. For example, the apparatus and method described herein are also suitable for use on other engine structures such as combustors and nozzle assemblies for example.

What is claimed is:

1. A welded assembly, comprising:
   a first sheet;
   a second sheet disposed over a portion of the first sheet, wherein an overlap area is defined where the first and second sheets overlap; and
   a weld disposed within the overlap area, wherein the weld connects the first sheet to the second sheet and is configured and adapted for distributing stress within the weld and overlapping portion of the second sheet,
   wherein the weld includes a weld line tracing an elliptical segment in the overlap area, and
   wherein the second sheet includes a laterally extending bend line parallel to a major axis of the elliptical segment.

2. A welded assembly as recited in claim 1, wherein the second sheet is configured to support a structure disposed in a gas turbine engine.

3. A welded assembly as recited in claim 1, wherein the first sheet is a hot sheet disposed within a gas turbine hot section.

4. A welded assembly as recited in claim 1, wherein the first sheet is a cold sheet of a gas turbine.

5. A welded assembly, as recited in claim 1,
   wherein the second sheet is a z-band coupling a hot sheet to a cold sheet of a gas turbine engine.

6. A welded assembly as recited in claim 1, wherein the weld includes a weld line tracing a straight line segment in the overlap area.

7. A welded assembly as recited in claim 1, wherein the weld includes a weld line tracing an arcuate segment in the overlap area.

8. A welded assembly, as recited in claim 1,
   wherein the weld line further traces a second and a third arcuate weld line segment disposed on opposite ends for the first arcuate segment and having curvatures different than that of the first arcuate segment.

9. A welded assembly as recited in claim 1, wherein the weld includes a weld line tracing an elliptical segment in the overlap area.

10. A welded assembly of claim 1,
    wherein the elliptical segment opens in direction opposite the bend line.

11. A welded assembly as recited in claim 1, wherein a distance between the weld line and the bend line is about a quarter the length of the minor radius of the elliptical segment.

12. A welded assembly as recited in claim 1, wherein an end of the weld line is offset from a lateral edge of the second sheet by a distance about one and a half times the minor radius of the elliptical segment.

13. A welded assembly as recited in claim 1, wherein the welded assembly is a lap joint.

14. A welded assembly, comprising:
    a first sheet;
    a second sheet disposed over a portion of the first sheet, wherein an overlap area is defined where the first and second sheets overlap; and
    a weld disposed within the overlap area, wherein the weld connects the first sheet to the second sheet and is configured and adapted for distributing stress within the weld and overlapping portion of the second sheet,
    wherein the weld includes a weld line tracing an elliptical segment in the overlap area, and
    wherein the elliptical weld line segment is centered with respect to a loading axis of the second sheet.

15. A gas turbine engine hot section, comprising:
    a welded assembly, including:
    a first sheet;
    a second sheet disposed over a portion of the first sheet, wherein an overlap area is defined where the first and second sheets overlap; and
    a weld disposed within the overlap area, wherein the weld connects the first sheet to the second sheet and is configured and adapted for distributing stress within the weld and overlapping portion of the second sheet,
    wherein the first sheet is a combustion gas space liner and the second sheet is a z-band for fixing the liner within the gas turbine engine;
    wherein the weld includes a weld line tracing an elliptical segment in the overlap area;
    wherein the second sheet includes a laterally extending bend line parallel to the major axis of the elliptical segment, the elliptical segment opening in direction opposite the bend line;
    wherein a distance between the weld line and the bend line is about a quarter the length of the minor radius of the elliptical segment;
    wherein a distance between an end of the elliptical segment and a lateral edge of the second sheet is about one and a half times the length of the minor radius of the elliptical segment; and
    wherein the elliptical segment is centered with respect to a loading axis of the second sheet.

16. A hot section as recited in claim 15, wherein the weld is configured such that the peak stress within the weld occurs laterally inward from an end of the weld.

* * * * *